L. SCHWITZER.
LUBRICATING MEANS FOR FANS.
APPLICATION FILED JAN. 2, 1920.
1,381,671.
Patented June 14, 1921.
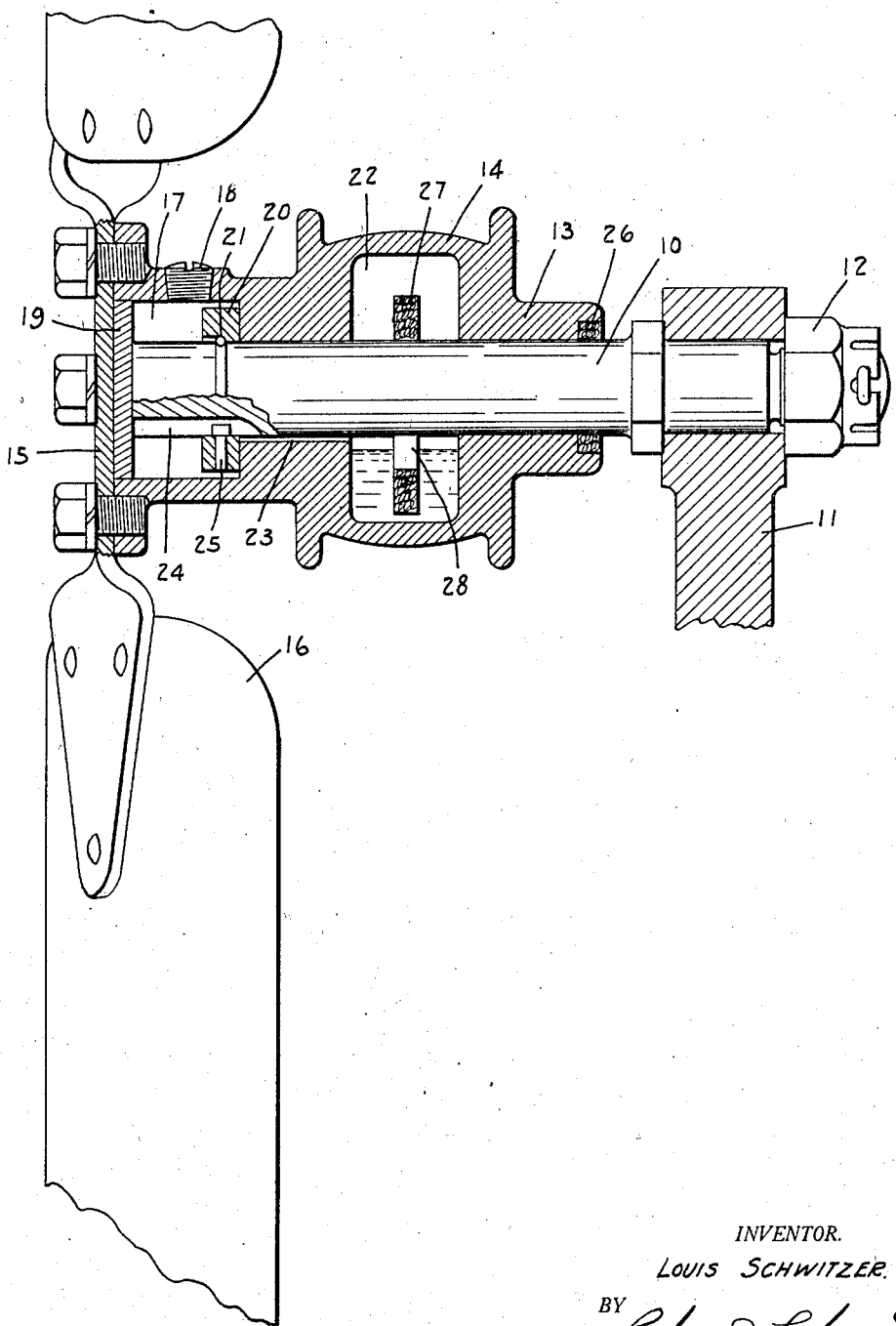
INVENTOR.
LOUIS SCHWITZER.
BY
ATTORNEYS.

UNITED STATES PATENT OFFICE.

LOUIS SCHWITZER, OF INDIANAPOLIS, INDIANA, ASSIGNOR TO AUTOMOTIVE PARTS COMPANY, OF INDIANAPOLIS, INDIANA.

LUBRICATING MEANS FOR FANS.

1,381,671.  Specification of Letters Patent.  Patented June 14, 1921.

Application filed January 2, 1920. Serial No. 348,839.

*To all whom it may concern:*

Be it known that I, LOUIS SCHWITZER, a citizen of the United States, and a resident of Indianapolis, county of Marion, and State of Indiana, have invented a certain new and useful Lubricating Means for Fans; and I do hereby declare that the following is a full, clear, and exact description thereof, reference being had to the accompanying drawings, in which like numerals refer to like parts.

This invention relates to a fan construction and more particularly to the lubricating means as applied to the hub revolving upon the spindle.

The main feature of the invention consists in constructing an oil reservoir within a solid hub and providing a flexible washer or ring for said reservoir which may be readily inserted therein through the bearing opening and supply a sufficient amount of lubrication to the bearing surfaces through capillary attraction.

The full nature of the invention will be understood from the accompanying drawings and the following description and claims:—

In the drawing there is shown a central vertical cross section through the fan construction.

In the drawings there is shown a spindle 10 rigidly mounted to an arm 11 adjustably secured to the forward portion of an internal combustion engine by a lock nut 12. Revolubly mounted upon the spindle there is a fan hub 13 having a belt pulley 14 integral therewith to which is secured a fan disk 15 upon which is mounted the fan blades 16. The outer portion of the hub 13 is provided with a chamber 17 acting as an oil reservoir with a filling inlet closed by a screw 18. A thrust washer 19 is provided within said chamber between the outer end of the spindle 10 and the fan disk 15, and a thrust washer 20 is mounted on the inner surface of said chamber and secured in place by a ring 21.

The enlarged pulley portion of the hub 13 is provided with a chamber or oil reservoir 22 which communicates with a reservoir 17 through the oil grooves 23, 24 and 25, whereby said reservoir 22 will be provided with oil so long as there is any in the reservoir 17. However, the reservoir 22 may be independently supplied with oil in any desired manner, such as through an opening in the side of the pulley wheel extending directly therein. The inner end of the hub 13 is provided with a bushing 26 of the ordinary type for preventing the escape of oil from the hub.

Mounted within the reservoir 22 there is a flexible ring 27 having an outer diameter of less than the diameter of said reservoir, and a central circular opening 28 of a greater diameter than the spindle 10, and so placed in said reservoir that the spindle 10 will extend through the circular opening 28. The ring 27 is made of flexible material so that it may be inserted through the opening in the hub 13 through which the spindle 10 extends, so as to avoid the necessity of forming a hub in two parts and placing the ring therein before assembling, or boring a larger hole and inserting a bushing, and thereby avoid the difficulties encountered, should the ordinary type of metal ring oilers be used.

In addition to the above, the ring 27 is formed of an absorbent material which has capillary attraction whereby the oil engaged by the periphery thereof when the supply is low or distributed about the inner periphery of the chamber by the centrifugal action of the rapidly revolving hub, will be fed to the inner periphery of the opening 28 by capillary attraction and engage the surface of the spindle 10. By means of this invention the bearing surface of the spindle 10 is fed with the proper supply of oil for lubricating it by its contact with the inner surface of the ring 27, although it does not engage the oil supply directly.

Although a spindle 10 has been shown and described above, the invention is not limited to the use of a spindle as it is the same whether said member is a spindle, shaft or axle, and the language of the claims is intended to cover such construction whether such member be an axle, shaft or spindle. Nor is the invention limited to a construction wherein the member 10 is stationary and the hub 13 is rotatable, as the hub may be stationary and the member 10 rotatable so far as this invention is concerned.

The invention claimed is:—

1. A lubricating system for hubs and the like including a stationary spindle upon which the hub is rotatably mounted, said hub having an annular chamber therein, means for supplying said chamber with lubricating material, and an annular absorbent ring surrounding said spindle and bearing thereon and within said chamber in position to engage the lubricating material contained therein and be rotatable with said lubricating material to cause it to be carried to said spindle for lubricating the bearing surface thereof.

2. A lubricating system for one-piece hubs and the like including a stationary spindle upon which the hub is rotatably mounted, said hub having an annular chamber therein through which said spindle extends, means for supplying said chamber with lubricating material, an annular ring formed of flexible material so as to permit its distortion and passage through the spindle into said chamber, said ring being composed of an absorbent material and surrounding said spindle and bearing thereon so as to engage the lubricating material contained within said chamber and be rotatable with and by said lubricating material to transport it to said spindle by capillary attraction for lubricating the bearing surfaces thereof.

3. In combination with a motor driven fan having a one piece hub and driving wheel connected with said fan, and bearing means upon which said fan and hub is adapted to rotate, a lubricating means for lubricating said bearing means having a plurality of annular chambers surrounding said bearing means and communicating with each other, said chambers providing a plurality of supporting surfaces, means for supplying lubricating material to one of said chambers, and a flexible absorbent ring adapted to be distorted so as to permit its passage into one of said chambers so as to apply the lubricating material contained therein to said bearing means by capillary attraction.

4. In combination with a motor driven fan having a hub and driving wheel connected with said fan, bearing means upon which said fan and hub is adapted to rotate, a lubricating means for lubricating said bearing means having a plurality of annular chambers surrounding said bearing means, and communicating with each other, said chambers providing a plurality of supporting surfaces, means for supplying lubricating material to one of said chambers, and an absorbent ring in one of said chambers so as to apply lubricating material contained therein to the bearing means by capillary attraction.

In witness whereof I have hereunto affixed my signature.

LOUIS SCHWITZER.